(12) United States Patent
Luginbill et al.

(10) Patent No.: US 7,194,087 B2
(45) Date of Patent: Mar. 20, 2007

(54) PHONE HOLDER ASSEMBLY

(75) Inventors: Neal W. Luginbill, Marysville, OH (US); Taro Shimokobe, Dublin, OH (US); Yuri Starik, Marysville, OH (US); Marek Myszkowski, Mississauga (CA)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 767 days.

(21) Appl. No.: 10/037,597

(22) Filed: Jan. 4, 2002

(65) Prior Publication Data
US 2003/0128840 A1 Jul. 10, 2003

(51) Int. Cl.
*H04M 1/04* (2006.01)
*H04M 1/11* (2006.01)
(52) U.S. Cl. .................. 379/455; D14/253; 455/575.1; 455/90.3
(58) Field of Classification Search ................ 379/446, 379/454, 455; 224/929, 269; D14/253; 455/575.1, 90.3
See application file for complete search history.

(56) References Cited

U.S. PATENT DOCUMENTS

| | | | | |
|---|---|---|---|---|
| 5,556,017 A | * | 9/1996 | Troy | 379/446 |
| 5,745,565 A | * | 4/1998 | Wakefield | 379/446 |
| 5,848,820 A | * | 12/1998 | Hecht et al. | 297/188.1 |
| 5,996,866 A | * | 12/1999 | Susko et al. | 224/929 |
| 6,032,027 A | | 2/2000 | Loza et al. | 455/575.9 |
| 6,084,963 A | * | 7/2000 | Hirai et al. | 379/446 |
| 6,263,080 B1 | * | 7/2001 | Klammer et al. | 379/446 |
| 6,396,925 B1 | * | 5/2002 | Close | 379/446 |
| D460,962 S | * | 7/2002 | Peiker | D14/253 |
| 6,543,637 B1 | * | 4/2003 | Osborn | 224/269 |

* cited by examiner

*Primary Examiner*—Harry S. Hong
(74) *Attorney, Agent, or Firm*—Rankin, Hill, Porter & Clark LLP; Mark E. Duell (57) ABSTRACT

A phone holding assembly adapted to hold a mobile telephone and including an outer member and an inner member. The outer member includes a series of mounting tabs that are adapted to releasably secure the phone holding assembly to a panel. The inner member includes mounting ears that extend through openings in the outer member to releasably secure the inner member to the outer member. When the inner member is secured within the outer member, a phone of a first size can be received therein, while when the inner member is removed from the outer member, a phone of a second, larger size can be held.

13 Claims, 6 Drawing Sheets

PHONE HOLDER ASSEMBLY

BACKGROUND OF THE INVENTION

1. Field of the Invention

The present invention relates generally relates to phone holders and, more particularly, to phone holder assemblies used to secure mobile phones within an automobile.

2. Description of Related Art

Assemblies for holding phones such as mobile portable phones (i.e., cellular phones) within automobiles are known in the art. For example, U.S. Pat. No. 6,032,027 teaches a holding arrangement for a mobile telephone that is disposed within a storage space of a center console. The holding arrangement includes a phone holding body that is pivotally supported by a pair of arms. When the console cover is open the phone holding body may be rotated between a storage position at a bottom portion of the console storage space and a use position at the open top of the console. The holding body further includes a spring-loaded carriage which, when the holding body is in the use position, may be moved outwardly or forwardly so as to project away further away from the console and place the mobile phone held thereon in a more accessible position.

The '027 phone holding assembly works satisfactorily, but suffers from several disadvantages. First, the holding body is difficult for the user to access and pivotally manipulate from the storage position due to its disposition deep within the storage space of the center console. Second, the '027 phone holding assembly occupies an inordinate amount of space within the center console storage space, and greatly reduces the available capacity of the storage space. Finally, the telephone held by the '027 phone holding assembly is only accessible when the console cover is open and, as such, may be uncomfortable to the driver and passenger.

SUMMARY OF THE INVENTION

The present invention is directed toward a phone holding assembly that is easily accessible to a driver for movement between a storage position and a use position. The present invention is further directed toward a phone holding assembly that does not interfere with storage of items within the center console.

In accordance with the present invention, a phone holding assembly includes a pivotal front panel assembly and a phone holder. The phone holder includes an outer member and an insert member. The outer member is adapted to be releasably secured to the front panel assembly, which is provided by a center console. The inner member is slidably and releasably received within the outer member. When the inner member is removed from the outer member, the outer member is adapted to receive a phone having a first size and, when the inner member is received within the outer member, the inner member is adapted to receive a phone having a second size.

In further accordance with the present invention, the front panel assembly is movable between a closed position and an open position. The phone holding assembly is retained in a generally vertical position when the front panel assembly is in the closed position, and moves with the front panel assembly into an angled or horizontal position as the front panel assembly is opened.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
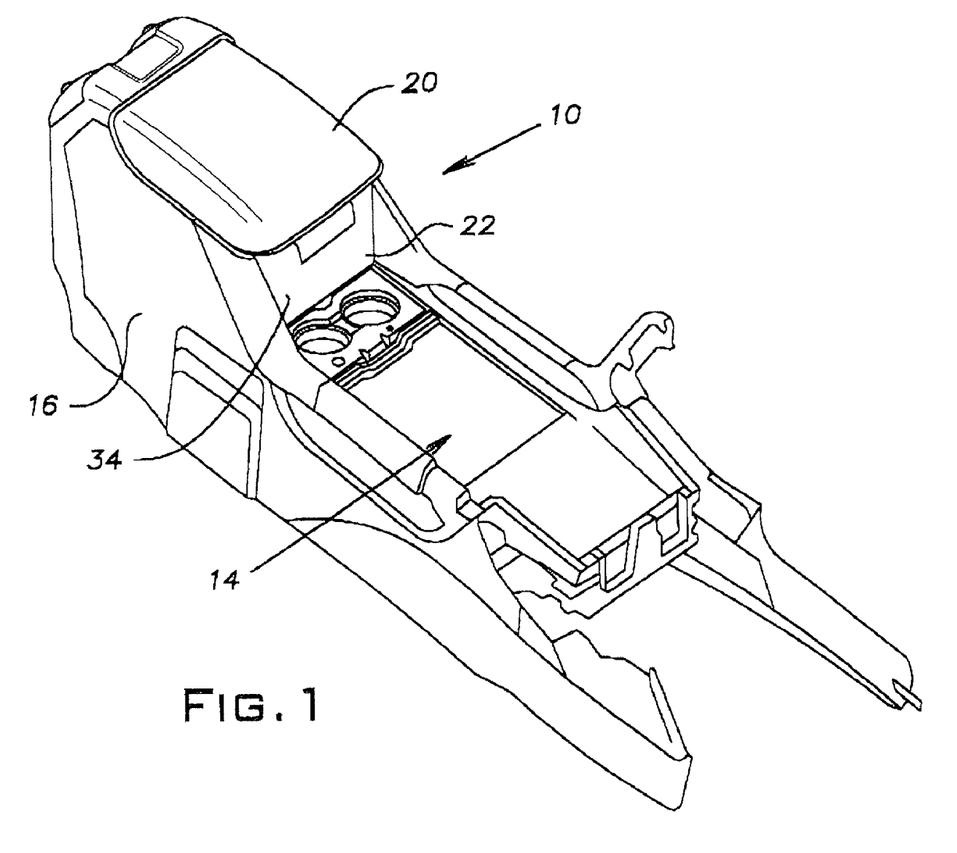
FIG. 1 is a perspective view of a center console with a front panel assembly shown in a closed position.

With reference to FIG. 1, a center console 10 incorporating a phone holder 12 according to the present invention is shown. The center console 10 is preferably disposed between the driver's seat and the passenger's seat in the front of a vehicle, and includes a storage compartment and a series of forward storage spaces 14. The storage spaces 14 include locations for cup holders, as well as other spaces that may be selectively covered and revealed by a sliding cover.

A central body member of the console 10 has a pair of sidewalls 16, a rear wall 18, an upper lid 20, and a front panel assembly 22 that cooperate to define the storage compartment. Preferably, the rear wall 18 and sidewalls 16 are integrally formed to provide a unitary structure. The sidewalls 16 define spaces into which hinge arms 26 extending from the front panel assembly 22 are received. Preferably, the spaces are curved or arcuate pockets 24 that have forwardly facing openings through which the hinge arms 26 extend, as will be described hereinafter.

The upper and forward ends of the sidewalls 16 are interconnected by a bar member 28, which defines first and second catches. The first catch releasably receives a latch 30 of the upper lid 20 to secure the upper lid in the closed position while the second catch releasably receives a latch 32 of the front panel assembly 22 to secure the front panel assembly 22 in the closed position. Preferably, an electrical accessory power connection or socket (not shown) is provided within the storage compartment of the center console 10 to permit convenient access to electrical power for a mobile phone.

Figure 2:
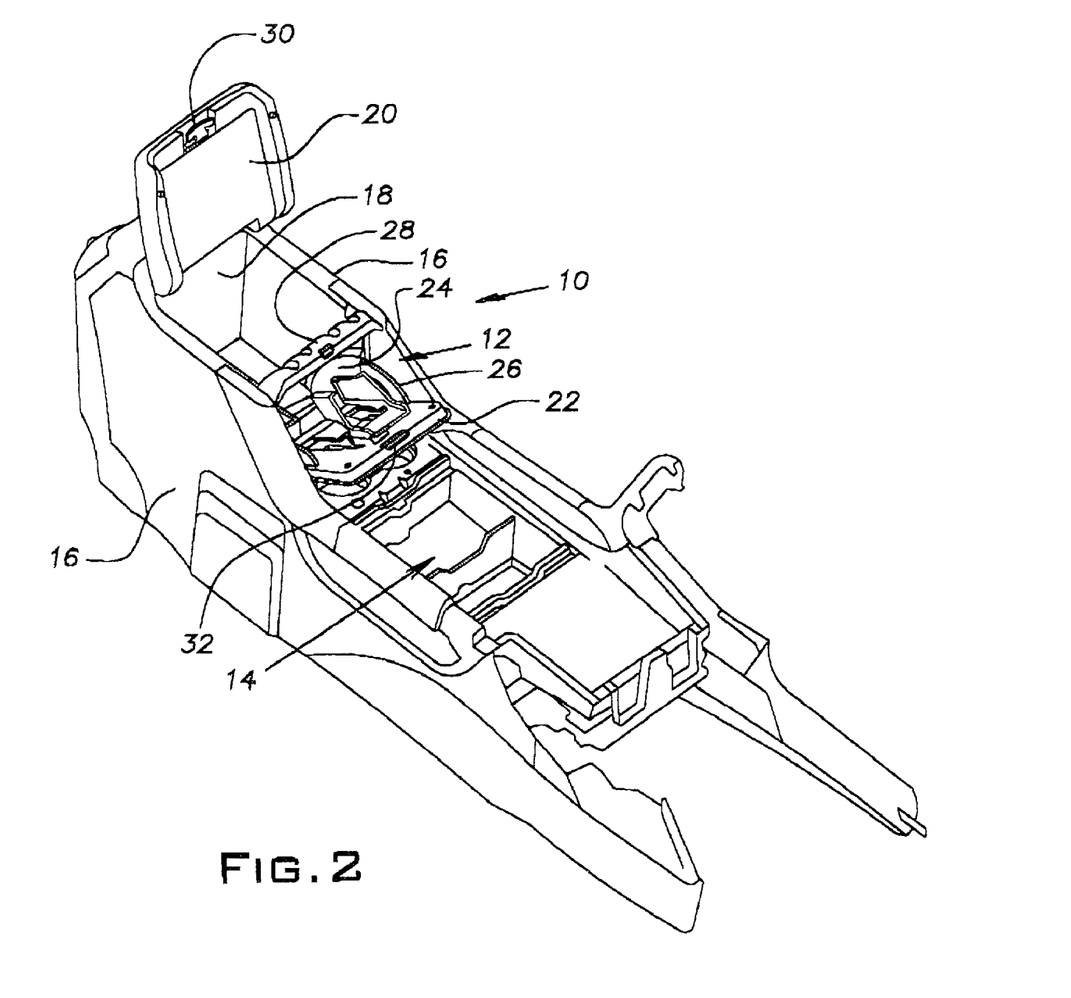
FIG. 2 is a perspective view similar to FIG. 1, but with the front panel assembly and upper lid in an open position.

The rear wall 18 has the upper lid 20 pivotally secured thereto, and may optionally have controls disposed on a rearward facing surface thereof to permit rear seat passengers to control operation of the rear HVAC system, as is known in the art. The upper lid 20 is pivotally movable between the closed position covering the storage compartment (FIG. 1) and an open position wherein the interior of the storage compartment is vertically accessible (FIG. 2). A forward end of the upper lid 20 includes the latch 30 to releasably secure the upper lid to the bar member 28, described briefly hereinbefore.

The front panel assembly 32 includes a cover member 34 and a front panel member 36. The cover member 34 is preferably vibration welded or otherwise mechanically secured to the front panel member 36 and serves as the forwardly facing surface of the front panel assembly 32, as is best seen in FIGS. 1 and 4.

Figure 3:
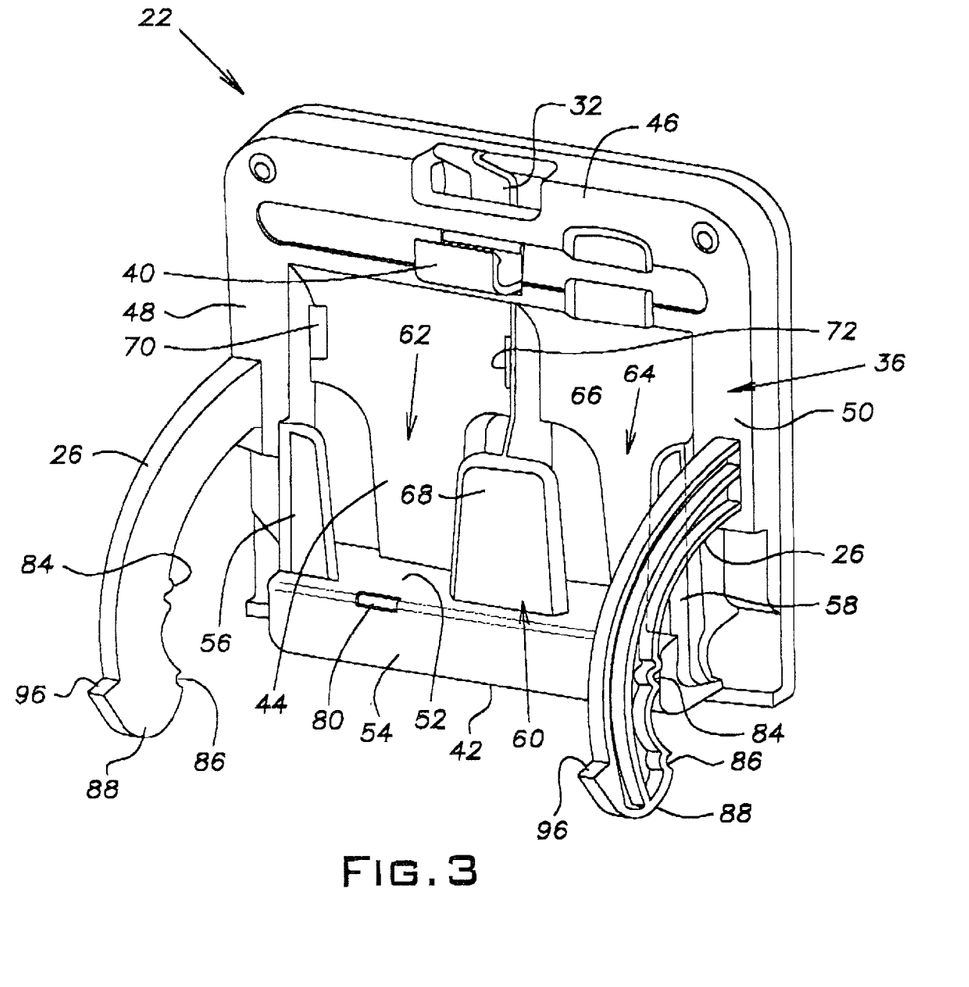
FIG. 3 is a rear perspective view of a front panel assembly.
Figure 4:
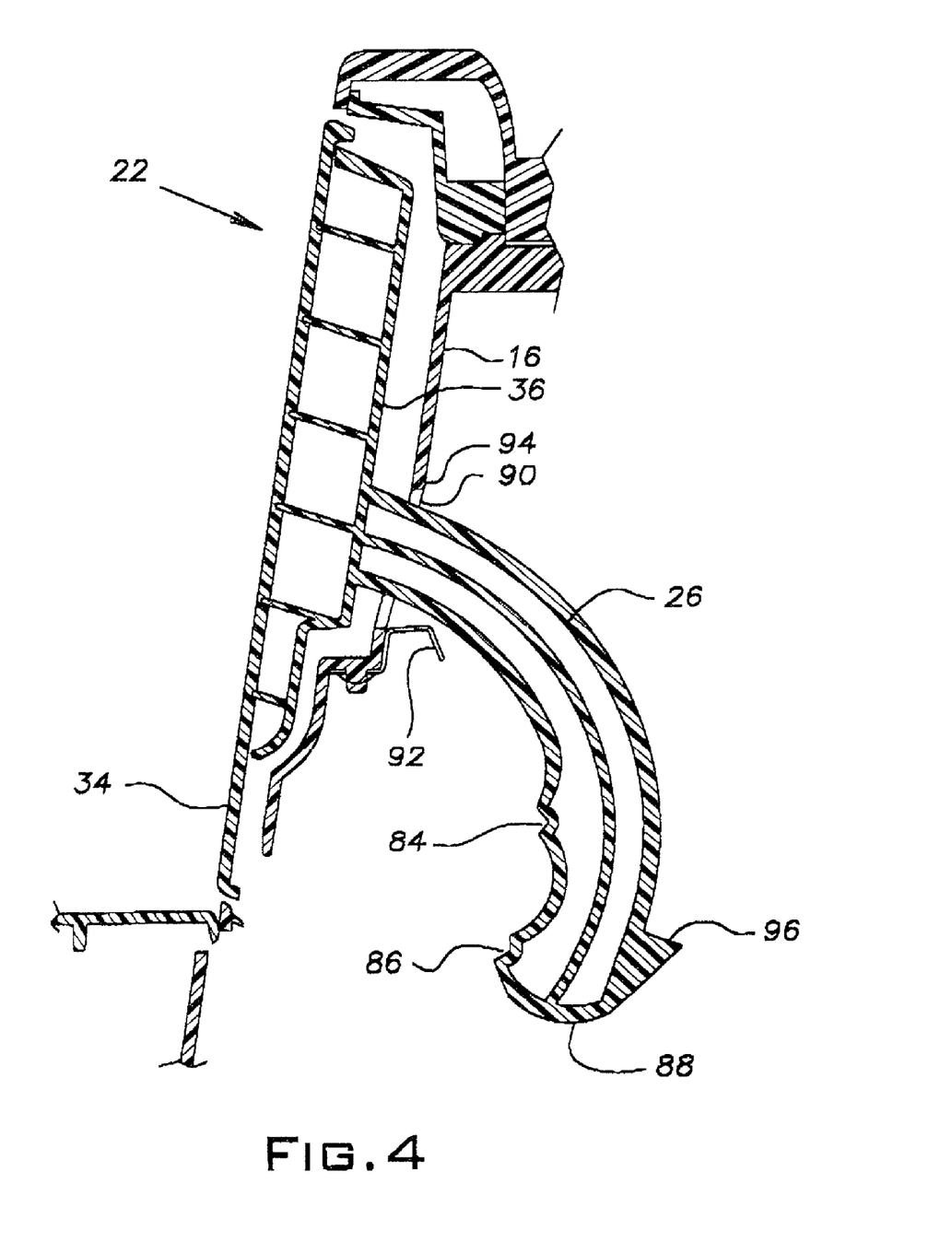
FIG. 4 is a cross-sectional view of the front panel assembly and a portion of the console.
Figure 5:
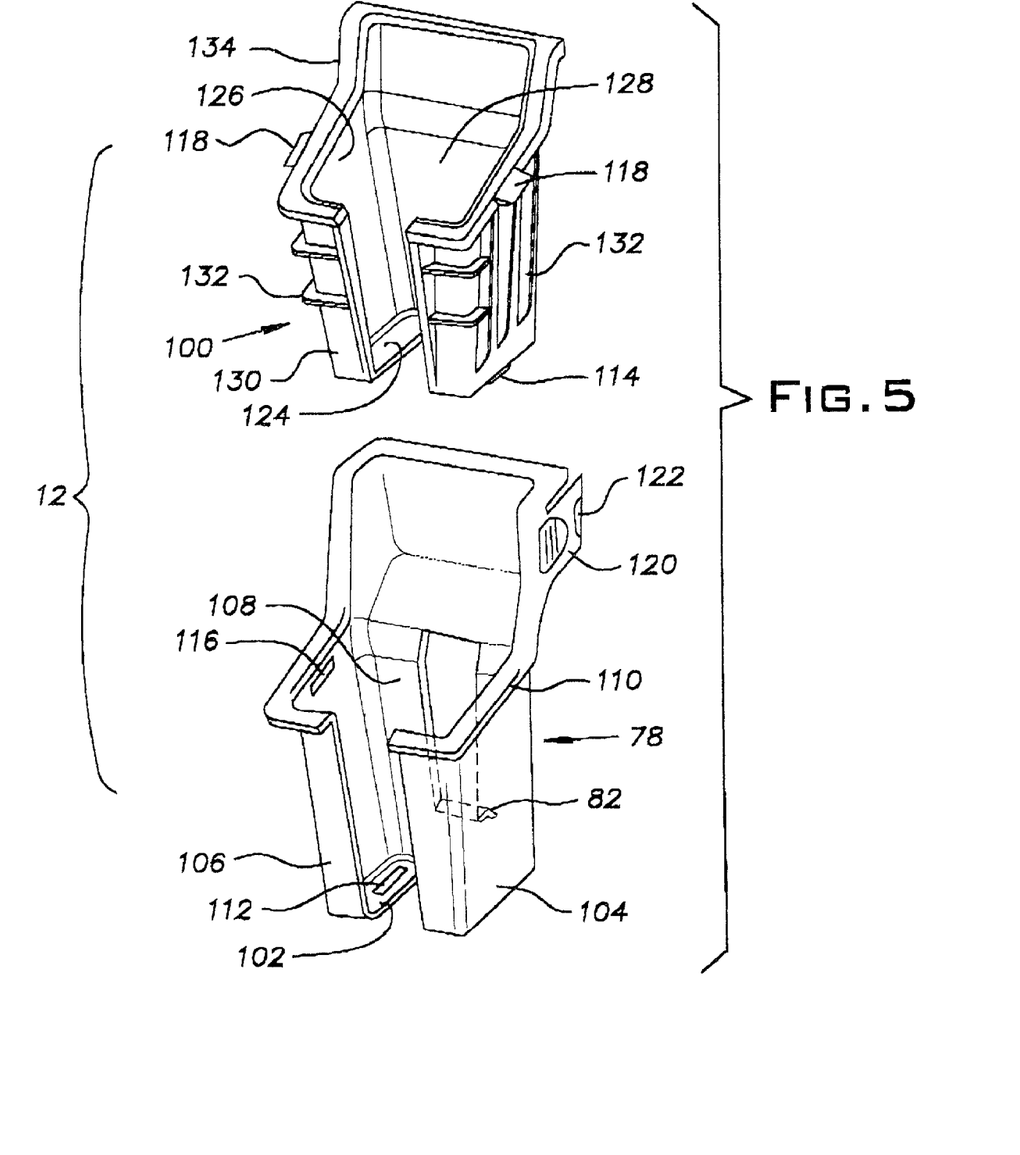
FIG. 5 is an exploded perspective view of a phone holder and the front panel assembly; and, FIG. 6 is a perspective view of the phone holder installed on the front panel assembly.

With reference to FIGS. 3–5, the front panel member 36 includes the pair of rearwardly extending hinge arms 26, a writing-instrument holding clip 40, and the latch 32. A rearwardly facing surface of the front panel member 36 includes a recessed center portion 44 that is surrounded by a pivot member 42, a raised upper portion 46, and first and second raised lateral portions 48, 50, as illustrated. The recessed center portion 44 has relatively large openings formed therein through which a rear surface of the cover member 34 is visible.

The pivot member 42 is disposed at a bottom of the front panel member 36 and rides upon a pair of hinge pins (not shown) that extend inwardly from the console sidewalls 16. The pivot member 42, which is generally C-shaped in cross section, includes a generally planar upper wall 52, a generally planar lower wall (now shown), and a curved rear wall 54. A forwardly directed opening of the pivot member 42 is covered by the cover member 34 and receives the hinge pins.

The pivot member upper wall 52 projects rearwardly from the recessed center portion 44 and cooperates with the raised portions 46, 48, 50, first and second lateral wall members 56, 58, and a divider wall member 60 to define first and second storage receptacles 62, 64. The first and second lateral wall members 56, 58 are generally L-shaped in cross section, and include a first portion extending rearwardly from the associated lateral raised portion 48, 50 and a second portion extending generally perpendicular to the first portion and inwardly toward the other lateral wall member. The lower ends of the lateral wall members 56, 58 are integral with the pivot member upper wall 52.

The divider wall member 60 is disposed intermediate the first and second lateral wall members 56, 58, and extends rearwardly from the front panel member 36 and upwardly from the pivot member upper wall 52. The divider wall member 60 includes a partition member 66 extending rearwardly from the front panel member 36 and a retaining arm 68 extending laterally from a distal end of the partition member 66 toward both the lateral wall members 56, 58. The retaining arm 68 is generally equal in length or height to that of the lateral wall members 56, 58 and is integral with the pivot member upper wall 52. The partition member 66 extends upwardly beyond the lateral wall members 56, 58 and the retaining arm 68 so as to traverse the recessed center portion 44 and engage a lower edge of the raised upper portion 46, as illustrated.

The first storage receptacle 62 is defined by the space subtended by the first lateral wall member 56, the first raised lateral portion 48, the raised upper portion 46, the divider wall member 60, the front panel member 36, and the upper wall 52 of the pivot member 42. Similarly, the second lateral wall member 58, the second raised lateral portion 50, the raised upper portion 46, the divider wall member 60, the front panel member 36, and the upper wall 52 of the pivot member 42 subtend the second storage receptacle 64. Preferably, the divider wall member 60 is not disposed in the center of the front panel member 36 and, as such, the first storage receptacle 62 is relatively larger than the second storage receptacle 64. The storage receptacles 62, 64 are adapted to hold small items, such as paper pads, etc.

As will be apparent from the following discussion, the front panel member 36 defines first and second mounting openings 70, 72 that are adapted to receive first and second attachment arms 120 provided by an outer member 78 of the phone holder, while the upper wall 52 of the pivot member 42 defines a third mounting opening 80 that is adapted to receive a hook-shaped mounting tab 82 provided by the phone holder outer member 78. The first mounting opening 70 is disposed relatively above the first lateral wall member 56 and adjacent the first raised lateral portion 48 while the second mounting opening 72 is disposed adjacent the partition member 66 of the divider wall member 60.

As noted previously, the hinge arms 26 are curved and extend rearwardly from the rear surfaces of the first and second raised lateral portions 48, 50 of front panel member 36. The hinge arms 26 are slidably received within the arcuate pockets 24 provided by the console sidewalls 16. Each of the hinge arms 26 includes first and second downwardly or forwardly extending detents 84, 86 and an enlarged distal end 88.

The first detents are 84 located at a position along the length of the hinge arms 26 such that the front panel assembly 22 may be maintained in a partially opened position (i.e., a position between full open and full closed positions). The first detents 84 are preferably disposed such that the front panel assembly 22 is held at about a 60° angle (FIG. 2), with the full closed position being 90° (FIG. 1) and the full open position being about 0°.

The second detents 86 are arranged at or near the distal end 88 of the hinge arms 26 and are provided to maintain the front panel assembly 22 generally at the full open position. The enlarged distal ends 88 of the hinge arms 26 prevent the hinge arms from being inadvertently removed from the arcuate pockets 24. Naturally, additional detents may be provided, or the position of the detents 84, 86 may be altered to adjust the angular orientation of the front panel assembly 22 when partially opened.

The sidewalls 16 include elements that cooperate with the hinge arms' detents 84, 86 to releasably maintain the front panel assembly 22 in the desired orientation. More specifically, and with reference to FIG. 4, the closed front panel assembly 22 and a portion of an associated sidewall 16 is shown in cross section through one of the hinge arms 26. The hinge arm 26 extends through the opening 90 in the sidewall 16, which provides a flexible tab 92 and a stop surface 94 adjacent the opening 90. The flexible tab 92 is secured relatively below the opening 90 while the stop surface 94 is relatively above the opening 90.

When the front panel assembly 22 is pivoted forwardly to an open position, the first detents 84 engage the flexible tab 92 to releasably retain the front panel assembly 22 in a partially opened position, as shown in FIG. 2. The tabs 92 are flexible or resilient so that the engagement between the tabs 92 and the first detents 84 may be overcome upon application of sufficient force to either close the front panel assembly 22 or further open the front panel assembly 22.

The second detents 86 are disposed at the distal enlarged end 88 of the hinge arms 26 and similarly engage the flexible tabs 92 when the front panel assembly 22 is completely opened. The engagement between the second detents 86 and the flexible tabs 92 may also be overcome to permit the front panel assembly 22 to move from the full open position toward the closed position. The enlarged distal end 88 provides a stop 96 that extends away from the distal end 88 and engages the stop surface 94 to prevent the front panel assembly from being opened beyond the full-open position (i.e., wherein the front panel is relatively horizontal).

The writing instrument holding clip 40, which is provided on the raised upper portion 46 relatively above the first and second storage receptacles 62, 64, is aligned with a groove. A writing instrument, such as a pen or pencil (not shown), may be snap-fitted between arms of the clip 40, and partially received in the groove. A pair of recesses may be provided in the upper raised portion to facilitate grasping and removing the writing instrument from the clip 40.

The front panel assembly latch 32 also extends through the front panel member 36, and is located relatively above the writing instrument holding clip 40. The latch 32 is adapted to snap over a rearwardly facing edge of the bar member 28, which serves as the second catch described hereinbefore.

The phone holder 12 is adapted for securement to the front panel member 36 of the front panel assembly 22. More specifically, the phone holder 12 includes the outer member 78, which is releasably secured to the front panel member 36 in a position overlying the first storage receptacle 62, and an inner or insert member 100, which is removably received within the outer member 78. As such, the phone holder 12 cooperates with the front panel member 36 to define a phone holding assembly.

The outer member 78 integrally includes a main body member and an upstanding support. The main body member includes a U-shaped bottom wall 102, a pair of sidewalls 104, a bifurcated front wall 106, a rear wall 108, and a peripheral upper flange 110. The bottom wall 102 and front wall 106 define a slotted opening to permit a power cord to extend upwardly to a mobile telephone received within the outer member 78 and to permit a front face or display of the mobile telephone to be visible when the mobile telephone is received in the holding assembly. The bottom wall 102 further defines a pair of slots 112 through which alignment ribs 114 projecting downwardly from the insert member 100 extend.

The peripheral upper flange 110 extends outwardly from upper ends of the sidewalls 104, the front wall 106, and the upstanding support, as illustrated. The sidewalls 104 define opposed openings 116 that are downwardly adjacent the upper flange 110 and releasably receive resilient mounting ears 118 extending from the insert member. The hook-shaped mounting tab 82 integrally extends from the rear wall 108, and is preferably disposed at a location close to a lower end of the rear wall. The hook-shaped mounting tab 82 is adapted to be inserted through the third mounting opening 80 in the pivot member 42 to assist in securing the outer member 78 to the front panel member 36.

The upstanding support integrally extends from the upper end of the rear wall 108, and provides a sloping surface that extends vertically and rearwardly away from a plane of the rear wall and first and second resilient attachment arms 120 (one shown). The attachment arms 120 have outwardly directed detents 122 that are snap-fittingly received within the associated first and second mounting openings 70, 72 formed in the front panel member 36, described hereinbefore. The detents 122 engage lateral surfaces or edges of the front panel member 36 surrounding the mounting openings 70, 72. The attachment arms 120 are resiliently displaceable to permit removal of the arms 120 from the first and second mounting openings 70, 72.

Figure 6:
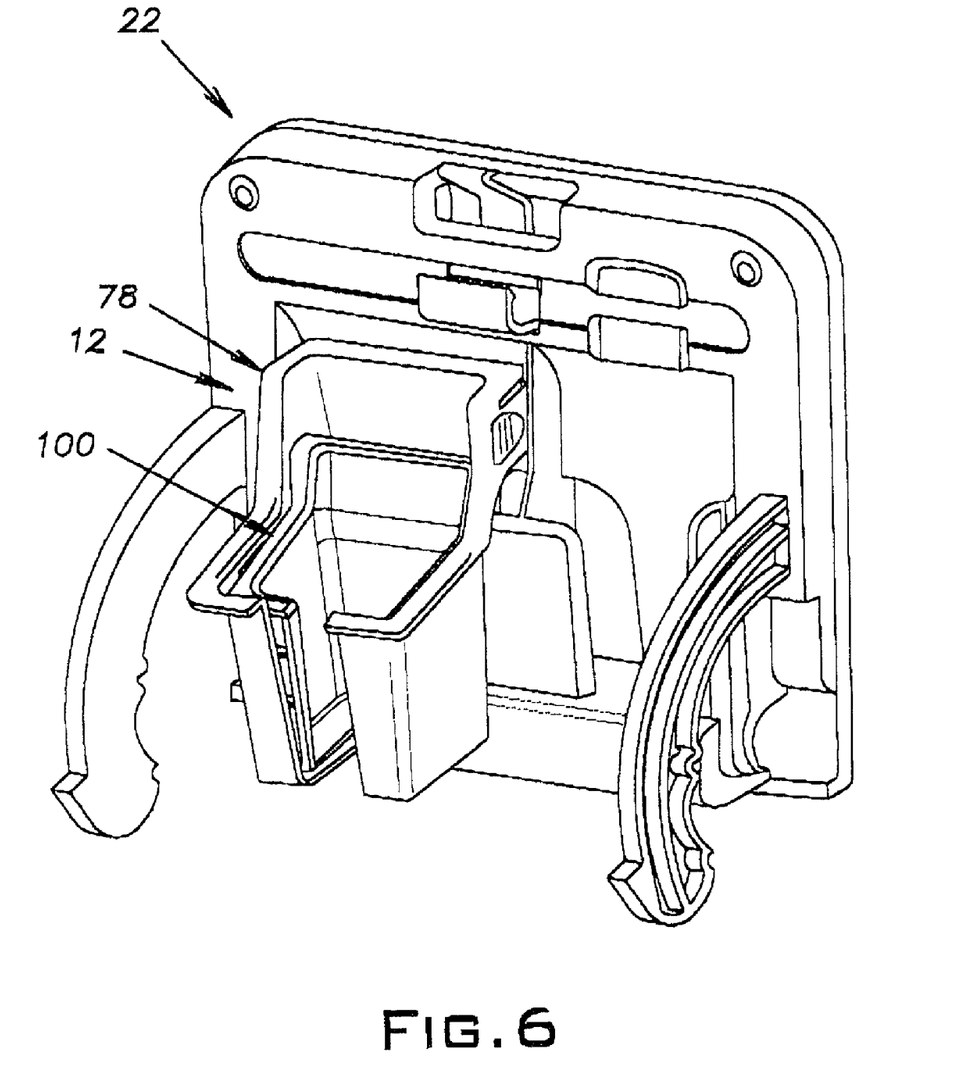

As will be appreciated from the foregoing and with reference to FIG. 6, the outer member 78 is secured to the front panel member 36 by inserting the hook-shaped mounting tab 82 through the third mounting opening 80 and then pivoting or rotating the outer member 78 toward the front panel member 36 to insert the attachment arms 120 through the associated first and second mounting openings 70, 72. As such, when the outer member 78 is secured to the front panel member 36, the outer member overlies the first storage receptacle 62. However, the outer member 78 preferably does not interfere with storage of items in at least a portion of the first storage receptacle 62 between the first lateral wall 56 and the divider wall member 60.

The insert member 100 is slidably received in the outer member 78, and includes a main body portion and an upstanding wing. Similar to the outer member, the insert member 100 includes a U-shaped lower wall 124, a pair of sidewalls 126, a rear wall 128, and a bifurcated front wall 130. The alignment ribs 114 extend downwardly from the lower wall 124 and are received in the slots 112 provided by the outer member bottom wall 102. Support ribs 132 also extend from the front wall 130, sidewalls 126, and rear wall 128 and define surfaces that engage inner surfaces of the outer member 78 as the insert member 100 is slidably inserted into and removed from the outer member. The support ribs 132 assist in properly aligning or positioning the insert member 100 during insertion, prevent the insert member 100 from being inadvertently adhered to the outer member inner surface by friction or vacuum, and stiffen the insert member against deformation.

The insert member upstanding wing integrally extends vertically and rearwardly from a plane defined by the insert member rear wall 128. When the insert member 100 is received in the outer member 78, the upstanding wing outer surface is adjacent and generally parallel to the sloping surface provided by the upstanding support of the outer member.

A peripheral rim 134 surrounds the upper end of the insert member walls 126, 128, 130 and the upstanding wing. The peripheral rim 134 has an outer edge that preferably engages an upper inner peripheral surface of the outer member 78 and is inwardly adjacent the peripheral flange 110 of the outer member 78. The opposed resilient ears 118 extend from the peripheral rim 134, and are inserted through the opposed openings 116 in the outer member sidewalls 104 to releasably secure the insert member 100 to the outer member 78.

The phone holder 12 and the phone holding assembly of the present invention offer several advantages over the state of the art. Firstly, a phone received within the holding assembly 12 is stored in a generally vertical position and does not significantly infringe upon the storage space of the center console 10. Secondly, the phone is accessible by the user by simply folding the front panel assembly 22 downwardly. Due to the bifurcated front walls of the outer member 78 and insert member 100, the user can easily see the phone display panel when the front panel assembly is held in either a partly opened position or a full open position. Further, due to the opening in the lower walls of the outer member 78 and insert member 100, a power cord may be connected to a phone received in the phone holder.

Although the phone may be operated while held in the phone holder assembly, it also may be conveniently removed therefrom. Also, with the phone holder assembly 12 of the present invention, phones of different sizes may be securely stored within the center console 10. For example, if the phone is relatively large, the insert member 100 can be removed from the outer member 78 to permit the phone to be received and held solely by the outer member 78. Alternatively, if the phone is relatively smaller, the insert member 100 is retained within the outer member 78 and the phone is received and held within the insert member 100.

Although the phone holder and phone holding assembly of the present invention has been described with particularity herein, the present invention is not limited thereto. Rather, it is considered apparent that numerous modifications, rearrangements, and replacement of parts may be resorted to without departing from the scope and spirit of the present invention. Accordingly, the present invention is only to be defined by the claims appended hereto.

What is claimed is:

1. A phone holder, comprising:
   an open topped outer member that is adapted to be releasably secured to a support; and,
   an open topped inner member that is slidably received within the outer member, said inner member being releasably secured to said outer member;
   wherein, when said inner member is removed from said outer member, said outer member is adapted to receive, via the open top thereof, a phone having a first size and, when said inner member is received within said outer member, said inner member is adapted to receive, via the open top thereof, a phone having a second size, and wherein each of said inner and outer members include a front wall that has an elongated opening through which a front of said phone is visible.

2. The phone holder according to claim 1, wherein each of said inner and outer members include a bottom wall that has an opening through which a power cord of said phone extends.

3. The phone holder according to claim 2, wherein said inner member includes outwardly extending ears that are snap fit through openings in the outer member.

4. The phone holder according to claim 3, wherein said inner member bottom wall includes alignment ribs that extend into slots formed in the bottom wall of the outer member.

5. The phone holder according to claim 4, wherein the outer member includes an upper peripheral rim and the inner member includes an upper peripheral rim, said inner member peripheral rim being disposed inwardly adjacent said outer member peripheral rim when said inner member is received within said outer member.

6. A phone holding assembly, comprising:
   a panel assembly pivotally movable between a closed position and an open position wherein said panel assembly is disposed generally vertically when said panel assembly is in a closed position;
   an open topped outer member that is adapted to be releasably secured to said panel assembly and movable with said panel assembly between said open and closed positions, said outer member being accessible when said panel assembly is in said open position and being inaccessible when said panel assembly is in said closed position; and,
   an open topped inner member that is adapted to be slidably received within the outer member, said inner member being releasably secured to said outer member;
   wherein, when said inner member is removed from said outer member, said outer member is adapted to receive, via the open top thereof, a phone having a first size and, when said inner member is received within said outer member, said inner member is adapted to receive, via the open top thereof, a phone having a second size.

7. The phone holding assembly according to claim 6, wherein said outer member includes a series of mounting tabs that are releasably secured within openings in the panel assembly.

8. The phone holding assembly according to claim 7, wherein each of said inner and outer members include a front wall that has an elongated opening through which a front of said phone is visible.

9. The phone holding assembly according to claim 8, wherein each of said inner and outer members include a bottom wall that has an opening through which a power cord of said phone extends.

10. The phone holding assembly according to claim 9, wherein said inner member includes outwardly extending ears that are snap fit through openings in the outer member.

11. The phone holding assembly according to claim 10, wherein said inner member bottom wall includes alignment ribs that extend into slots formed in the bottom wall of the outer member.

12. The phone holding assembly according to claim 11, wherein the outer member includes an upper peripheral rim and the inner member includes an upper peripheral rim, said inner member peripheral rim being disposed inwardly adjacent said outer member peripheral rim when said inner member is received within said outer member.

13. The phone holding assembly according to claim 6, wherein said outer member being disposed generally vertically when said panel assembly is in said closed position.

* * * * *